United States Patent [19]

De Luca et al.

[11] 4,386,243
[45] May 31, 1983

[54] TELEPHONE TEST SHOE HAVING RESILIENT LATCHING MEANS

[75] Inventors: Paul V. De Luca, Plandome Manor; Helmut Neuwirth, Garden City; Robert Oddsen, Northport, all of N.Y.

[73] Assignee: Porta Systems Corp., Syosset, N.Y.

[21] Appl. No.: 289,968

[22] Filed: Aug. 4, 1981

[51] Int. Cl.³ .......................................... H01R 13/629
[52] U.S. Cl. ............................ 179/175.1 R; 179/186; 179/189 R; 339/75 M
[58] Field of Search ................ 179/175.1 R, 178, 179, 179/184, 186, 189 R; 324/158 F, 158 P; 200/51.04, 320, 321, 322-324; 339/75 R, 75 M, 255 R, 254 M; 292/34, 158, 170

[56] References Cited

U.S. PATENT DOCUMENTS 1,174,652 3/1916 Banks ..................................... 292/34
3,890,814 6/1975 Fantoni ............................... 292/170
4,298,239 11/1981 Montalto et al. ................ 339/75 M Primary Examiner—Stafford D. Schreyer
Attorney, Agent, or Firm—Charles E. Temko

[57] ABSTRACT

A test shoe adapted to engage a discrete area on a telephone connector block normally mounted upon a telephone main frame for the purpose of interfacing with a plurality of individual subscriber circuits appearing on the block through protector modules. The shoe is configured to afford adequate clearance with respect to the projecting handles on the modules, the shoe being mounted in position by the engagement of a resiliently urged laterally moving latch released by push button means accessible from an outer surface of the shoe.

1 Claim, 2 Drawing Figures

TELEPHONE TEST SHOE HAVING RESILIENT LATCHING MEANS

BACKGROUND OF THE INVENTION

This invention relates generally to the field of telephony, and more particularly to an improved test shoe adapted to be placed in engagement with the exposed ends of subscriber pair cables appearing on a telephone connector or protector block.

As is known in the art, to afford protection to office switching and other equipment, it is common practice to bring individual subscriber pair cables into the office for appearance on a main frame having a plurality of connector and protector blocks. The latter are engaged by so-called protector modules which complete the tip and ring circuits to the switching equipment, the modules including a variety of protective devices which ground excessive currents caused by the occurrence of lightning strikes, fallen cables and the like. As the installation of new subscriber circuits is made, it is convenient to serially test a large number of such circuits using standard procedures, by interfacing the test equipment at the point where the protector modules are subsequently connected, or at adjacent test fields. With the development of protector modules having test points on an exposed surface thereof, it is desirable that the same test shoe engage either such points or the contacts appearing on the connector block.

It is also known in the art to provide large test shoes for this purpose capable of simultaneously engaging up to one hundred subscriber pairs, the engagement of each pair requiring interconnection for tip and ring circuits. Engagement is made by the contact of spring urged projections with corresponding oversized sockets, and once engaged, the shoe is maintained in position by the provision of an interference fit between the handle portion of the module and corresponding recesses in the shoe. Because of the large number of such interference fits, one with each module handle, considerable frictional force is developed when an attempt is made to remove the shoe after the completion of test procedures, and difficulty in overcoming the frictional force is often encountered. The above described structure is usually bulky, not inexpensive to manufacture, and not always convenient to use, particularly in those locations offering only limited access to the face of the protector block.

SUMMARY OF THE INVENTION

Briefly stated, the invention contemplates the provision of an improved test shoe of the class described of somewhat smaller dimensions which may be used singly or in conjunction with similar shoes to cover the entire surface of a protector block, and which includes self-contained means connecting and disconnecting the shoe to and from the protector block. Retention is provided by the engagement of a resiliently urged laterally moving latch means with an undercut surface of the handle member of several of the installed protector modules. The latch means is released by manually applied pressure upon a push button which cams the latch means into retracted position.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
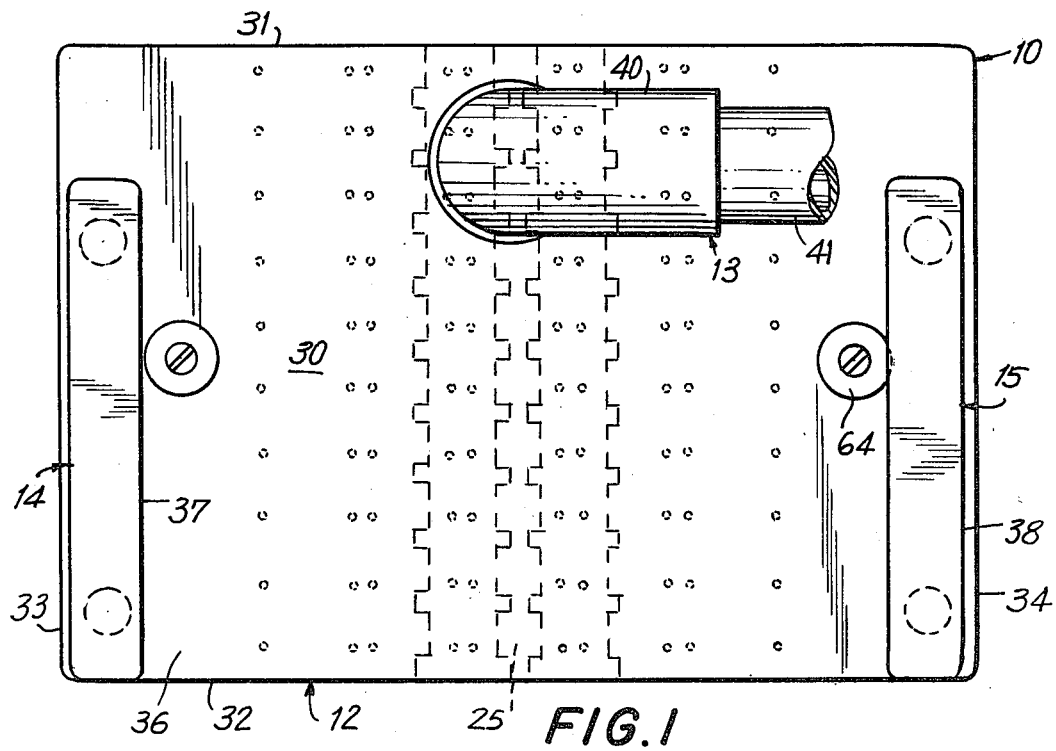
FIG. 1 is a top plan view of an embodiment of the invention.
Figure 2:
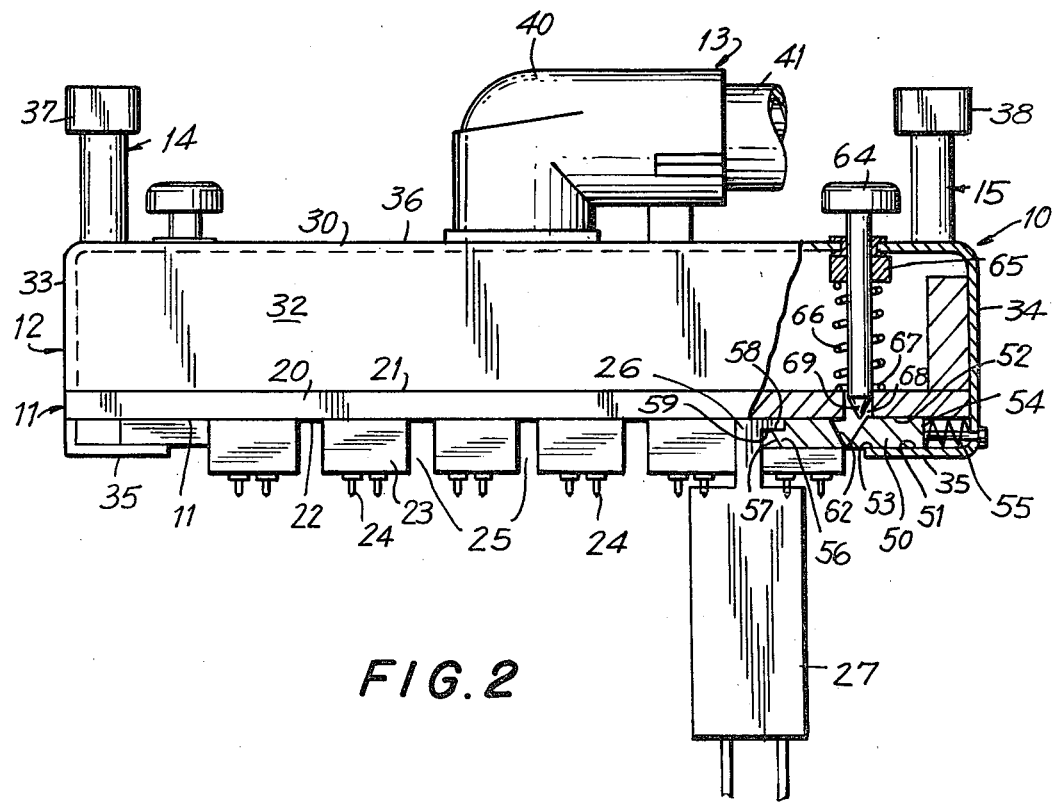
FIG. 2 is an end elevational view thereof, partially broken away in section to show detail.

In accordance with the invention, the device, generally indicated by reference character 10, comprises broadly: a base plate element 11, and opposed latching means 14 and 15.

The base plate element 11 is most conveniently formed as a synthetic resinous molding, and includes a plate member 20 having an outwardly facing surface 21. Extending inwardly from an inwardly facing surface 22 are a plurality of parallel elongated projections 23 from which resiliently urged pins 24 project. The projections 23 form a plurality of recesses 25 for reception of the handle portion 26 of known protector modules 27 in well known manner.

The cover element 12 may also be formed as a synthetic resinous molding, and includes an outer planar wall 30, side walls 31 and 32, as well as end walls 33 and 34. A flange wall 35 surrounds the area of the projections 23, and encloses the latching means 14 and 15. Extending outwardly from the outwardly facing surface 36 of the planar wall 30 are first and second handle members 37 and 38, respectively.

The connector element 13 is conventional, and includes an angularly disposed fixture 40 surrounding a group of cable pairs 41 leading to test equipment (not shown).

The latching means 14 and 15 are similar and symmetrical, and, accordingly, a description of one will serve to describe the other. Each includes a transversely extending latch member 50 disposed within a recess 51 between the inner surface 52 of the plate member 20 and a surface 53 of the flange wall 35. A first end surface 54 bears against a leafspring 55, and a second end surface 56 is provided with a cam portion 57 overlying an undercut portion 58 which selectively engages undercut surfaces 59 on a handle portion 26 of a protector module 27. A wedge-shaped recess 62 is medially positioned, and includes a camming surface cooperating with a push button 64. The button is slidably position within a bushing 65 in the outer wall 30, and a sleeve 66, the lower end 67 of which communicates with the surface 21 above an underlying opening 68. A wedge-shaped tip 69 corresponds to the configuration of the recess 62, and is aligned therewith when the latch member 50 is in withdrawn condition.

In operation, the device 10 is positioned over the desired area containing a plurality of protector modules related to a predetermined group of subscriber pair circuits. It is pressed into position permitting the handle portions of the modules to enter the recesses in the device until the latch member 50 of each of the means 14 and 15 is deflected by contact with the handle portion of the modules. When the transversely extending portion thereof has passed the latch members, the device is locked in place so that desired tests can be made. To release the device 10, the fingers of the user's hands engage the handle members 37 and 38 so that the thumbs can press against the push buttons 64 to withdraw the latch members 50, following which the device 10 is merely moved outwardly to release the modules.

During engaged condition, the pins contact the test points in the module in well known manner.

It is to be understood that it is not considered that the invention lies within the specific details of structure shown and set forth in this specification, for obvious modifications will occur to those skilled in the art to which the invention pertains.

What is claimed is:

1. An improved telephone test shoe for effecting an interface between test equipment and test points located on an outer surface of each of plurality of protector modules, each engaged upon a telephone connector block, comprising: a base plate element having a plurality of projections thereon including resiliently urged contact pins, said projections defining recesses for the accommodation of handle portions of said protector modules; a first laterally extending latch member slidably associated with said base plate element and adapted to selectively engage undercut surfaces on said handle portions of said protector modules when disposed within said recesses; resilient means for urging said latch member to project into said recesses, and camming means accessible from an outer surface of said shoe selectively engaging said latch member to urge the same to withdraw when positioned; a second latch member and second camming means positioned in coplanar relation with respect to said first mentioned latch member and camming means, and operating in an opposite direction; and first and second handle means on an exposed surface of said shoe adjacent said first and second camming means, so positioned that engagement of the fingers of each hand of a user with a respective one of said handle means positions the thumb of the user for engagement of said camming means to permit said shoe to be manually supported for removal upon disengagement of said latch members.

* * * * *